(12) United States Patent
Poudrier

(10) Patent No.: US 10,376,045 B1
(45) Date of Patent: Aug. 13, 2019

(54) VERSATILE ARTICLE SUPPORT DEVICE

(71) Applicant: Alan Stanley Poudrier, Niceville, FL (US)

(72) Inventor: Alan Stanley Poudrier, Niceville, FL (US)

( * ) Notice: Subject to any disclaimer, the term of this patent is extended or adjusted under 35 U.S.C. 154(b) by 0 days.

(21) Appl. No.: 16/125,672

(22) Filed: Sep. 8, 2018

Related U.S. Application Data

(63) Continuation-in-part of application No. 15/962,262, filed on Apr. 25, 2018.

(51) Int. Cl.
| | | |
|---|---|---|
| *A47F 7/00* | (2006.01) | |
| *B62B 3/02* | (2006.01) | |
| *A47B 47/00* | (2006.01) | |
| *B62B 3/10* | (2006.01) | |
| *B62B 3/00* | (2006.01) | |
| *A47B 81/00* | (2006.01) | |

(52) U.S. Cl.
CPC ............... *A47B 47/00* (2013.01); *A47B 81/00* (2013.01); *B62B 3/002* (2013.01); *B62B 3/10* (2013.01)

(58) Field of Classification Search
CPC ........ A47F 5/137; A47F 5/13; B05B 13/0285; A47B 47/00; A47B 81/00; B62B 3/10; B62B 3/002
See application file for complete search history.

(56) References Cited

U.S. PATENT DOCUMENTS

| | | | | |
|---|---|---|---|---|
| 3,689,098 A | * | 9/1972 | Rubin ..................... | B62B 3/005 280/33.998 |
| 4,176,831 A | * | 12/1979 | Adams ..................... | B62B 3/10 269/17 |
| D357,102 S | * | 4/1995 | Tate ............................. | D34/17 |
| 5,439,152 A | * | 8/1995 | Campbell ................ | B60R 9/00 108/55.1 |
| 5,520,316 A | * | 5/1996 | Chen ........................ | B60R 7/02 211/12 |
| 6,123,208 A | * | 9/2000 | Haenszel ............... | A47B 45/00 108/55.1 |

(Continued)

Primary Examiner — Kimberley S Wright

(57) ABSTRACT

An article support device that can be arranged in a plurality of architectures to suit the user's needs and can be easily collapsed for storage and/or transported within a vehicles cargo area. The article support device uses a horizontal frame member with a plurality of positions to receive one or more vertical frame members that can be secured into desired positions. The frame members may also be arranged in an architecture to support a raised platform by attaching two or more vertical frame members to the horizontal frame member. Hinge pin receivers may be attached to the vertical frame members. The hinge pin receivers accept the hinge pins that are attached to SUV doors. When the hinge pins of SUV doors are aligned with the hinge pin receivers on a vertical frame member, the SUV doors can be secured to the article support device by lowering the SUV doors and hinge pins into the hinge pin receivers until the doors are in a position resting on the horizontal frame section the article support device. An axle frame and tires may be attached to the article support for easy mobility of the device. A plurality of axle frames may also be added to the article support to increase the load capacity of the device.

11 Claims, 9 Drawing Sheets

(56) References Cited

U.S. PATENT DOCUMENTS

| | | | | |
|---|---|---|---|---|
| 6,224,072 B1* | 5/2001 | Weck | ............... | B62B 3/02 |
| | | | | 211/204 |
| 6,394,267 B1* | 5/2002 | Craig | ............... | B65D 88/528 |
| | | | | 206/321 |
| 6,786,494 B2* | 9/2004 | Garbiso | ............... | B62B 3/10 |
| | | | | 280/35 |
| 6,793,223 B2* | 9/2004 | Ondrasik | ............... | B60B 33/0002 |
| | | | | 280/33.997 |
| 6,966,574 B1* | 11/2005 | Dahl | ............... | B62B 1/002 |
| | | | | 280/47.18 |
| 7,008,166 B1* | 3/2006 | Grimes | ............... | B66C 23/48 |
| | | | | 254/114 |
| 7,097,053 B1* | 8/2006 | Karl | ............... | A47B 57/04 |
| | | | | 211/186 |
| 7,237,993 B2* | 7/2007 | Farley | ............... | B65D 19/44 |
| | | | | 410/43 |
| 7,784,802 B2* | 8/2010 | White | ............... | B62B 3/02 |
| | | | | 280/47.41 |
| 7,802,526 B2* | 9/2010 | Brady | ............... | B65D 19/12 |
| | | | | 108/53.5 |
| 8,042,829 B2* | 10/2011 | Hailston | ............... | B62B 3/008 |
| | | | | 280/30 |
| 8,181,796 B2* | 5/2012 | DiFazio | ............... | B65G 65/00 |
| | | | | 211/41.14 |
| 8,191,717 B2* | 6/2012 | Mantenuto | ............... | B65D 19/18 |
| | | | | 211/41.15 |
| 8,590,921 B2* | 11/2013 | Benson | ............... | B62B 3/008 |
| | | | | 182/123 |
| 9,493,295 B2* | 11/2016 | Glover | ............... | B65D 19/44 |
| 2014/0217045 A1* | 8/2014 | Nesin | ............... | A47F 7/00 |
| | | | | 211/85.8 |

* cited by examiner

US 10,376,045 B1

VERSATILE ARTICLE SUPPORT DEVICE

This application is a continuation-in-part of U.S. patent application Ser. No. 15/962,262, filed on Apr. 25, 2018 which is incorporated herein by reference in its entirety.

BACKGROUND OF THE INVENTION

1. Field of the Invention

The present invention relates to a versatile device that can support articles in a range of positions and a variety of applications as defined by the needs of the user. Wheels or casters may be easily attached to the device enabling the user to move the device and articles being supported to a desired location.

2. Background of the Prior Art

Many people who enjoy outdoor activities own sport utility vehicles (SUVs) with doors that can be removed in order to give occupants more outdoor pleasure while riding in the vehicle with doors removed. Some devices are available for storing the doors, but such devices do not offer any purpose beyond this singular function and they are not readily available for use when the SUV owner is away from home. The devices also take up space when they are not being utilized for their intended purpose. Owners of SUVs with removable doors find that they simply lack a compact device which is easy to transport and can support the removable SUV doors at their outdoor recreation destination. Owners of bulky devices that support and store the removable SUV doors have little or no use for the device when the doors are not removed.

Accordingly, there is a need in the art for a device that can increase the overall utility of a SUV door holder so that device has substantial utility to a user beyond the primary function. Such a device must provide support for a variety of articles as defined by the users' needs and also be collapsible when the device is not being utilized for easy storage or transport of the device via the limited cargo area of a vehicle. Such a device must be of relatively simple construction and be easy to use.

SUMMARY OF THE INVENTION

The versatile article support of the present invention addresses the aforementioned needs in the art by providing a device that is relatively small in size, such that it can be transported within the cargo area of most midsize SUVs and even many compact vehicles. The device is primarily comprised of rectangular frame members that can quickly be secured to an open position and readily support a variety of articles based on the user's needs. Securement holes allow the user to insert bolts, eyebolts, or hooks through the frame members to secure articles as defined by the user's needs. Casters can also be attached to the frame in order to provide mobility of the article support device.

For example, the article support device can be transported in the cargo area of a vehicle in the collapsed position. Upon arrival at a destination a user can position the article support framework such that the second frame member will be at a 90 degree angle with respect to the first frame member. Hinge pin receivers can be attached in the appropriate holes in the second frame member to align with the hinge pins of the SUV door. An individual who removes the doors from the SUV secures the doors on the article support device by aligning the door's hinge pins to the hinge pin receivers on the second frame member.

The discussion included in this patent is intended to serve as a basic description. The reader should be aware that the specific discussion may not explicitly describe all embodiments possible and alternatives are implicit. Also, this discussion may not fully explain the generic nature of the invention and may not explicitly show how each feature or element can actually be representative of a broader function or of a great variety of alternative or equivalent elements. Again, these are implicitly included in this disclosure. Where the invention is described in device-oriented terminology, each element of the device implicitly performs a function. It should also be understood that a variety of changes may be made without departing from the essence of the invention. Such changes are also implicitly included in the description. These changes still fall within the scope of this invention.

BRIEF DESCRIPTION OF THE DRAWINGS

Similar reference numerals refer to similar parts throughout the several views of the drawings.

DESCRIPTION OF THE PREFERRED EMBODIMENT

Figure 1:
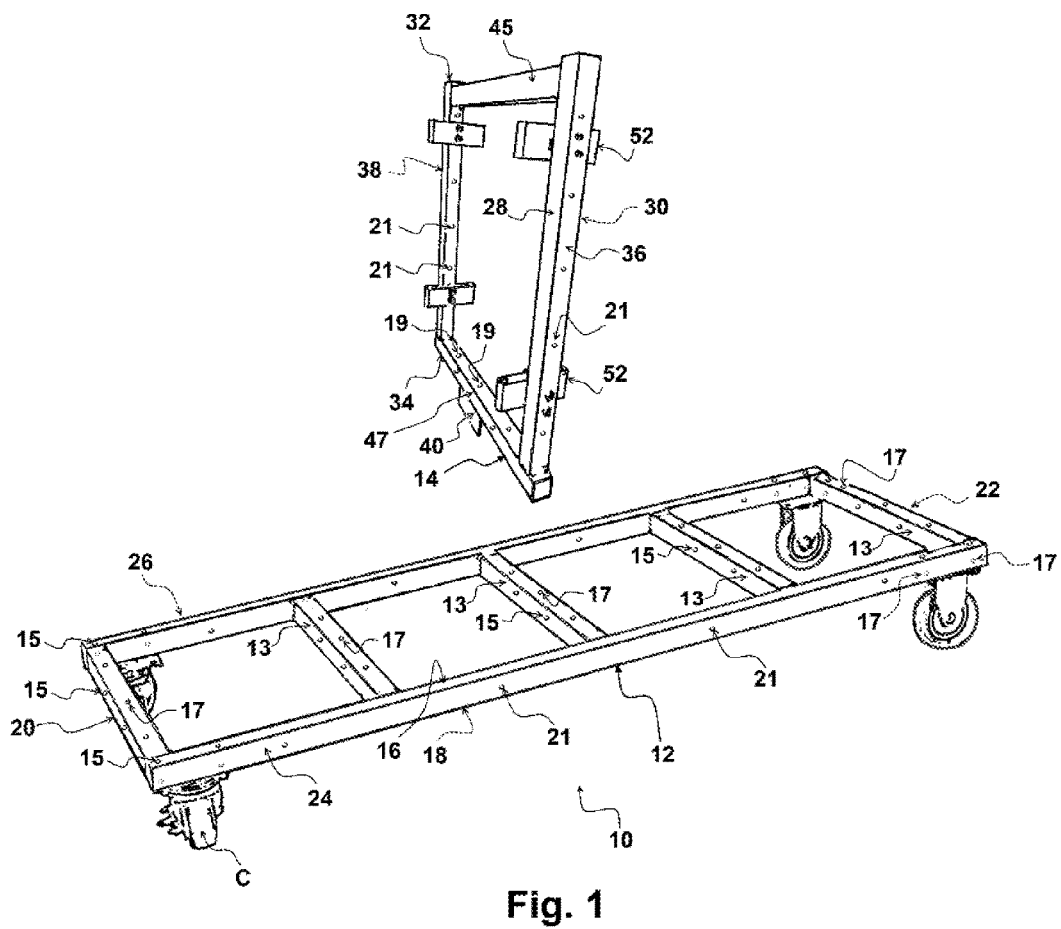
FIG. 1 is a perspective view of the article support.
Figure 2:
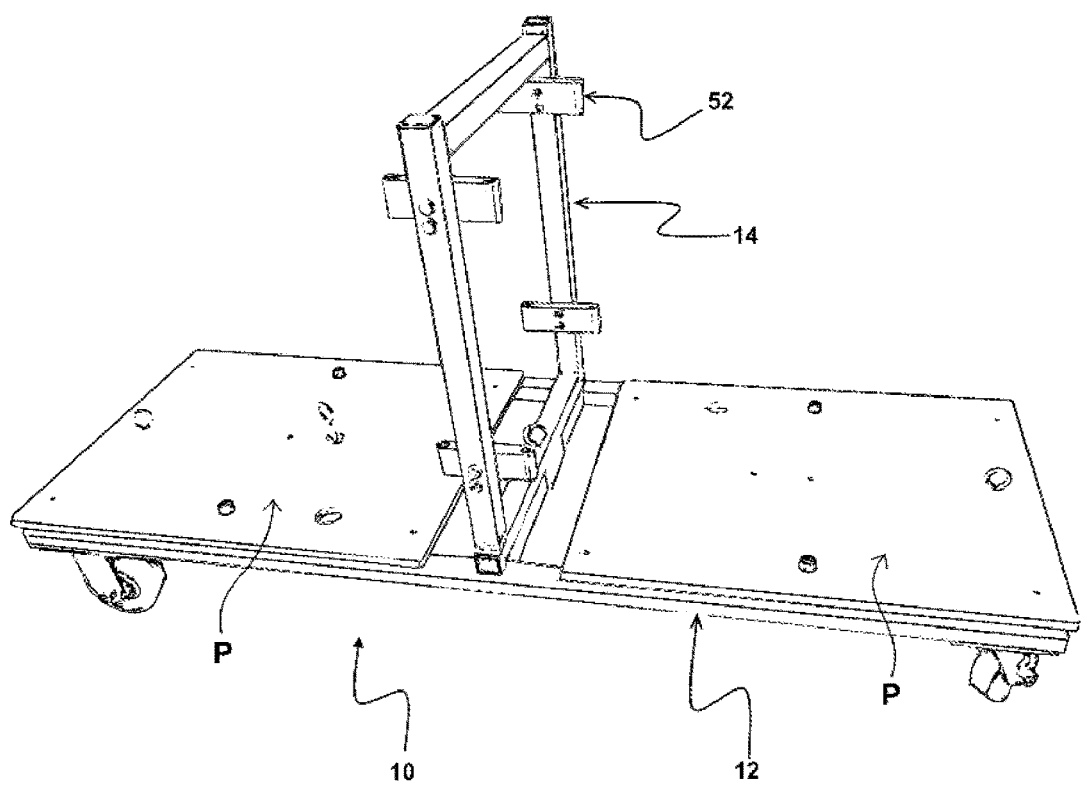
FIG. 2 is a perspective view of the article support with 2 platforms.
Figure 3:
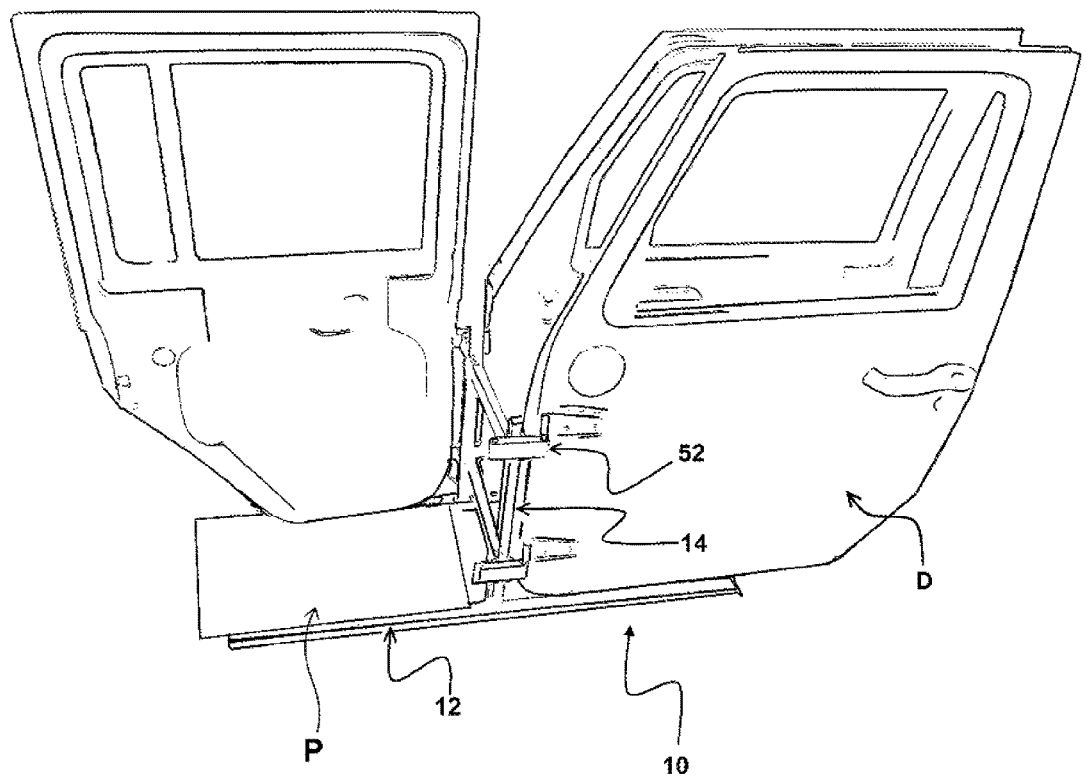
FIG. 3 is an environmental of the article support with SUV doors on the platforms

Referring now to the drawings, it is seen that the article support device of the present invention, generally denoted by reference numeral 10, is comprised of a generally rectangular shaped first frame member 12, and a generally rectangular shaped second frame member 14.

The horizontally positioned first frame member 12 having tubular cross bar members 13 joining the first side 24 to the second side 26 by appropriate method (i.e.: welded or bonded) to form the rectangular shaped frame member 12. The first frame member 12 having a first top side 16 and a first bottom side 18. The first frame member 12 also having a first end 20 and a second end 22. The first frame member 12 having a plurality of first holes 15 that pass horizontally through the first frame member 12 for securing accessories to the first frame member 12 and also having a plurality of second holes 17 that pass vertically through the first frame member 12 for securing accessories to the first frame member 12.

The second frame member 14 having a second top side 28 and a second bottom side 30, the second frame member 14 also having third end 32 and a fourth end 34. The second frame member 14 also having a third side 36 and a fourth side 38. The second frame member 14 having a first tubular cross bar member 45 connecting the third side 36 to the fourth side 38 proximate the third end 32 and the second frame member 14 having a second tubular cross bar member 47 connecting the third side 36 to the fourth side 38 proximate the fourth end 34. The second frame member 14 also having an alignment member 40 attached to the second tubular cross bar member 47 on the second top side 28 of the second frame member 14. The second tubular cross bar member 47 also having a plurality of third holes 19 that pass through the tubular cross bar member 47. The third holes 19 aligning with second holes 17 of the first frame member 12, allowing the second frame member 14 to be secured to the first frame member 12. The second frame member 14 also having a plurality of fourth holes 21 that pass through the second frame member 14 for securing accessories to the second frame member 14.

The second frame member 14 also having a plurality of hinge pin receivers 52 by an appropriate method (bolts, bonding, or welding). The hinge pin receivers 52 having a third top side 53 and a third bottom side 54 and, also having holes 55 passing through the hinge pin receivers 52 from the third top side 53 to the third bottom side 54.

One or more second frame members 14 can be appropriately attached to the first frame member 12 in user desired position(s) in user defined fashion such that the second frame member(s) 14 and the hinge pin receivers 52 may be used to support SUV doors D when the doors are removed from the vehicle and also support platforms P, for outdoor recreational activities such as a barbeque grill G, and sink based on the user's needs.

Casters C can be attached to the first frame member 12 when the casters' top plates (not shown) are aligned with first holes 15 of the first frame member 10.

One or more axle frames 60 may be added to the first frame member 12 to improve the mobility of the article support device 10. An axle frame 60 having an axle tube 62 comprised of square tubing having a fifth side 64, a sixth side 66, a seventh side 68, and an eighth side 70. The axle tube 62 also having two fifth ends 72. The axle frame 60 also having legs 74 extending at a right angle from the eighth side 70 proximate the fifth ends 72 of the axle tube 62. Each leg 74 having an inboard side 76 and an outboard side 78 and each leg 74 also having a contact end 79. The axle frame 60 also having a leg support member 80. The leg support member 80 having a fourth top side 82 and a fourth bottom side 84 and also having sixth ends 73. The leg support member 80 having a bend proximate the center middle such that the center of fourth top side 82 of the leg support member 80 is approximately ½" from contact with the center of the eighth side 70 of the axle tube 62. The sixth ends 73 of the leg support member 80 are connected to the inboard sides 76 of the legs 74 proximate the contact ends 79.

Figure 4:
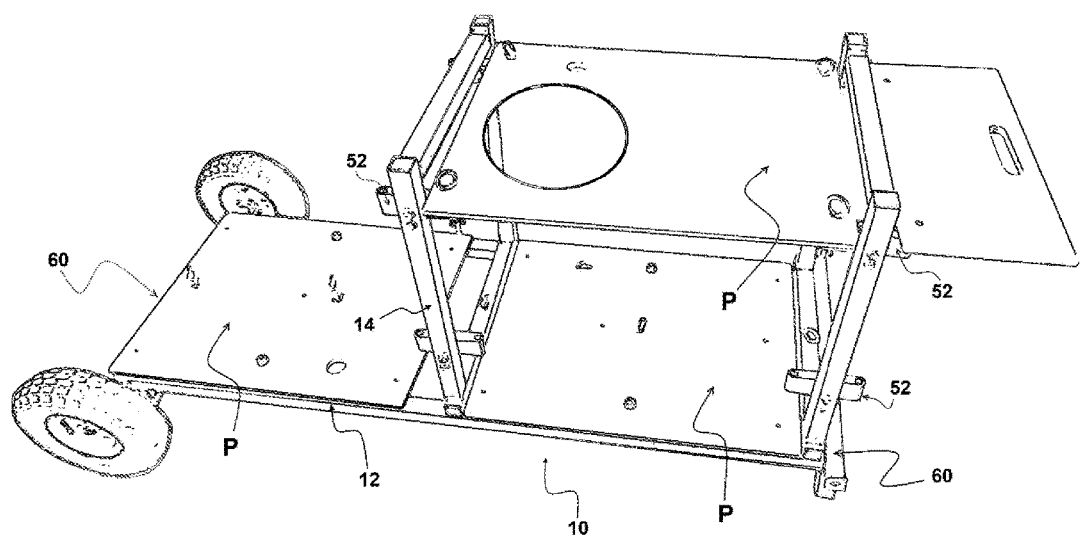
FIG. 4 is an environmental view of the article support receiver supporting a $3^{rd}$ platform.
Figure 5:
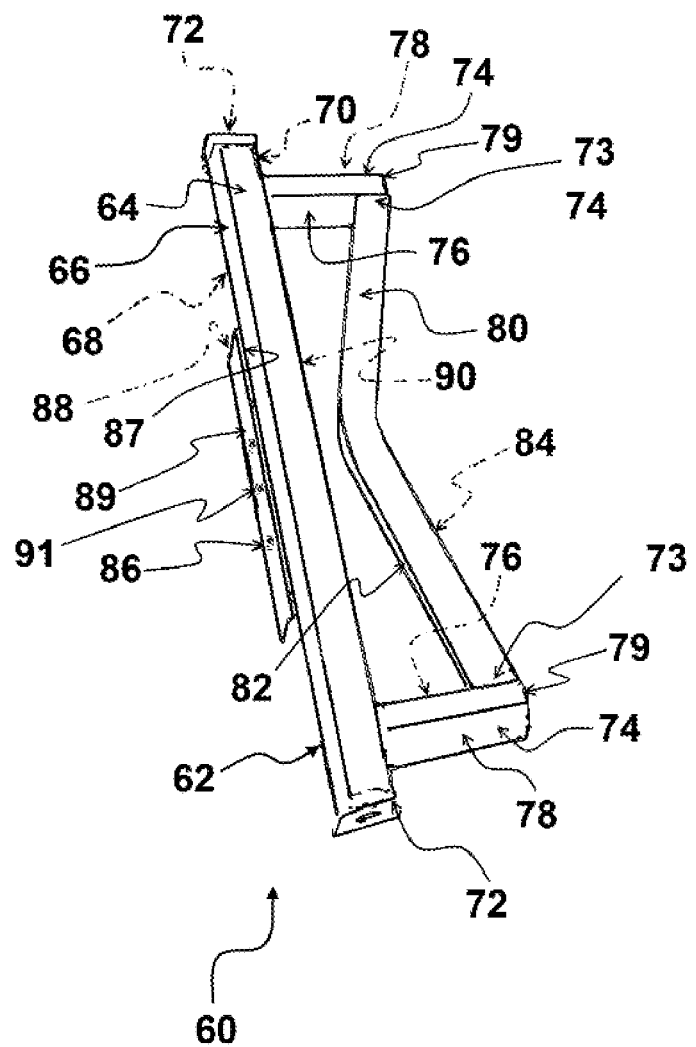
FIG. 5 is a perspective view of the axle frame.
Figure 6:
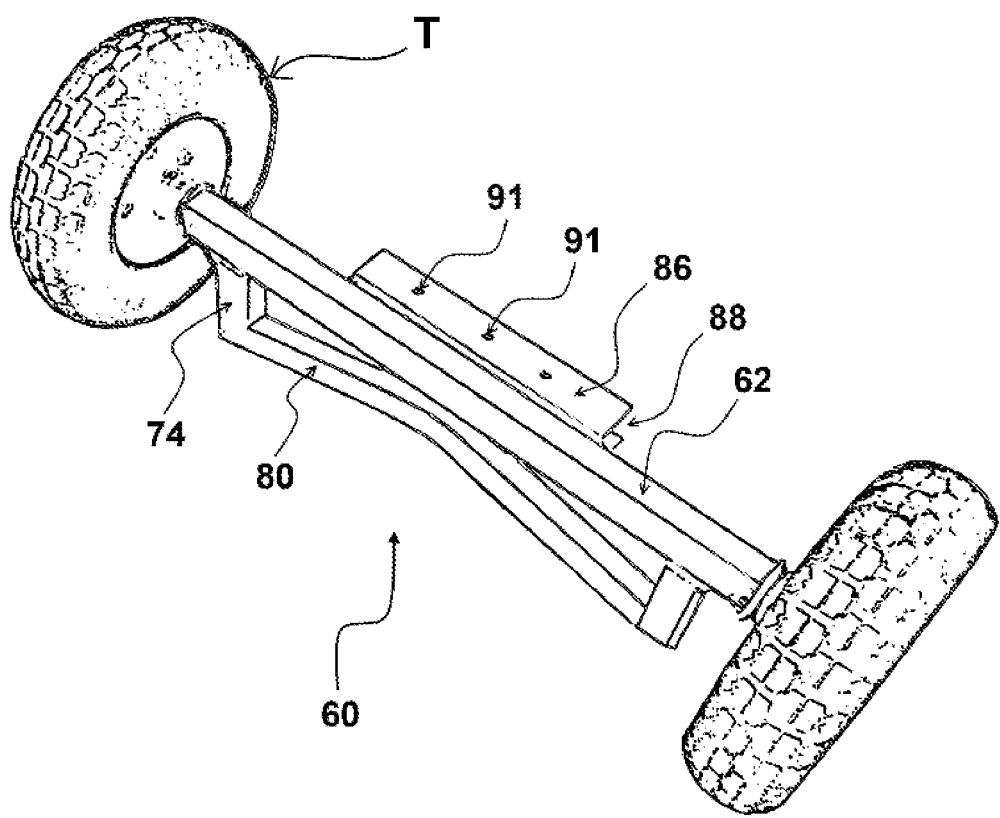
FIG. 6 is a perspective view of the axle frame with an axle and tire attached
Figure 7:
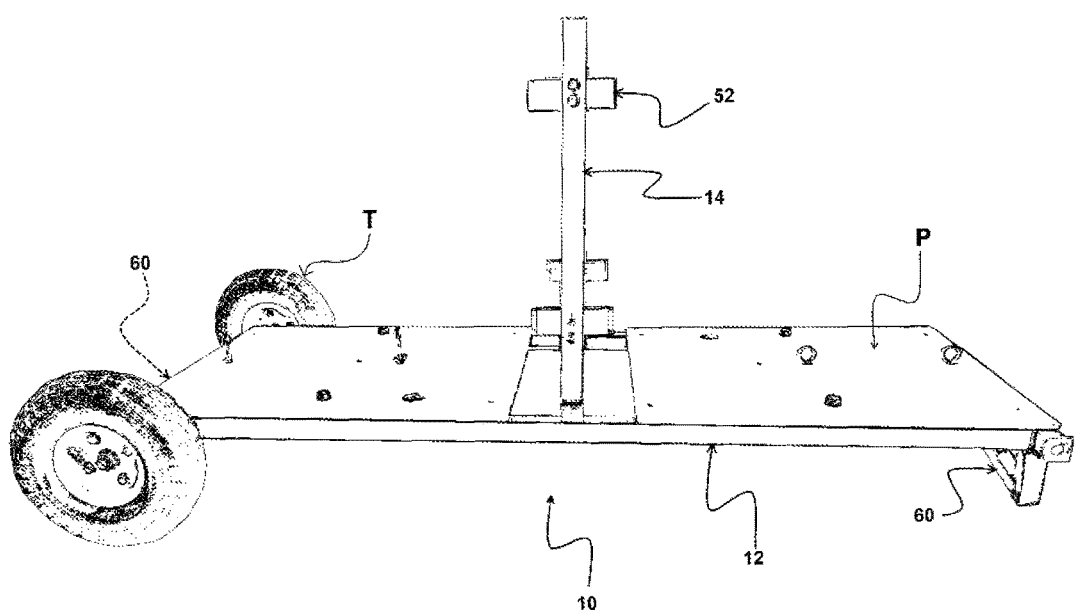
FIG. 7 is an environmental view of the article support with the axle frame.

The axle frame 60 also having a channel member 86. The channel member 86 having a back side 87 and an open front side 88. The channel member 60 also having a ninth side 89 and a tenth side 90. Securement holes 91 align with first holes 15 in the first frame member 12 to allow bolts or pins (not shown) to pass through the channel members 86 from the ninth side 89 to the tenth side 90 in order to secure the axle frame 60 to the first frame member 12. The axle frame can be attached to the first frame 12 in a first position as seen in FIG. 4 and FIG. 7 by sliding the open front side 88 of the channel member 60 onto a tubular cross bar member 13 on the first bottom side 18 of the first frame 12. In this first position, one axle frame 60 has an axle (not shown) and tires T supporting the first frame member 12 and the legs 80 of a second axle frame 60 rest on the ground.

Figure 8:
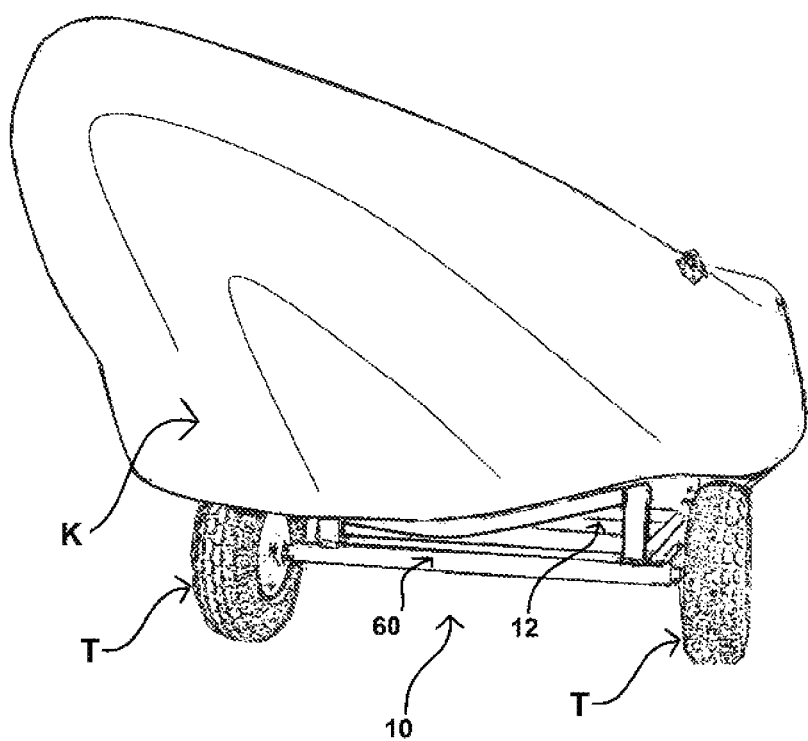
FIG. 8 is an environmental view of the article support in an inverted position with the axle frame supporting a kayak.

As seen in FIG. 8 the article support device can be inverted by rotating the axle frame 60 to a second horizontal position wherein, the first top side 18 is in a resting position under the first frame 12 and the first bottom side 16 is in a resting position above the first frame 12. The bend of leg support member 80 is now in a position such that the versatile article support 10 serves to support and transport a kayak K.

Figure 9:
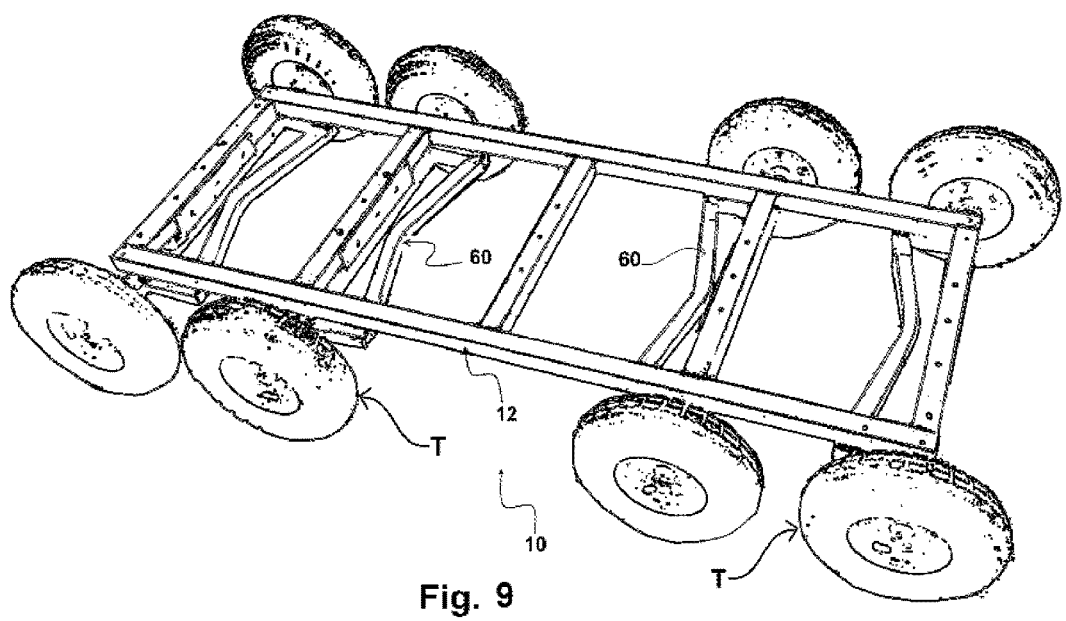
FIG. 9 is an environmental view of the article support with multiple axle frames.

The axle frame 60 may be attached to tubular cross bar members 13 of the first frame 12 in an alternative positions by aligning securement holes 91 of the axle frame 60 with second holes 17 of the first frame member 12. In the alternative position an axle frame 60 can be used on each of the tubular cross bar members 13 of the first frame member 12 as seen in FIG. 9.

While the invention has been particularly shown and described with reference to an embodiment thereof, it will be appreciated by those skilled in the art that various changes in form and detail may be made without departing from the spirit and scope of the invention.

I claim:

1. An article support system comprising: a) rectangular-shaped first frame member comprising: i) a first side; ii) a second side; iii) a first top side; iv) a first bottom side; v) a first end; vi) a second end; vii) a plurality of tubular cross bar members joining the first side to the second side; viii) a plurality of first holes passing horizontally through the first frame member; ix) a plurality of second holes passing vertically through the first frame member; and b) a generally rectangular-shaped, removable second frame member comprising: i) a second top side; ii) a second bottom side; iii) a third end; iv) a fourth end; v) a third side; vi) a fourth side; vii) a first tubular cross bar member connecting the third side to the fourth side proximate the third end; viii) a second tubular cross bar member connecting the third side to the fourth side proximate the fourth end; ix) a plurality of third holes passing vertically through the second frame member; and x) a plurality of fourth holes passing horizontally through the second frame member; c) the second frame member also having a plurality of hinge pin receivers wherein the hinge pin receivers extending to the second top side and also to the second bottom side of the second frame member, wherein the hinge pin receivers comprising; i) a third top side; ii) a third bottom side; and iii) holes passing through hinge pin receivers from the third top side to the third bottom side; d) the article support system also having a removable axle frame comprising: i) two legs; ii) an axle tube; iii) a leg support member; and iii) a channel member; e) the legs, wherein each leg comprising: i) an inboard side; ii) an outboard side; iii) a contact end; iv) a fourth top side; and v) a fourth bottom side wherein, the inboard sides of the legs are connected to the leg support member proximate the contact ends of the legs; and f) the axle tube comprising: i) a fifth side; ii) a sixth side; iii) a seventh side; iv) an eighth side; wherein the legs are attached to the axle tube extending at a right angle from the eighth side proximate the fifth ends of axle tube; and g) the leg support member wherein the fifth ends of the leg support member are connected to the inboard sides of the legs proximate the contact ends of the legs and the leg support member having a bend such that the center of the fourth top side of the leg support member is approximately ½" from contact with the center of the eighth side of the axle tube; h) the channel member comprising: i) a back side; ii) a front side; iii) a ninth side; iv) a tenth side; and v) securement holes.

2. The article support device as in claim 1, wherein a second frame member is vertically attached to a horizontally positioned first frame member, and wherein hinge pin receivers are attachable along the second frame member such that the hinge pin receivers extend to both sides of the second frame member in a use orientation, wherein articles are attached to hinge pin receivers and said articles rest on the first top side within the footprint of the first frame member on one and/or both sides of the vertically positioned second frame member of said device.

3. The article support device as in claim 1, wherein a second frame member is vertically attached to a horizontally positioned first frame member, and wherein hinge pin receivers are attachable along the second frame member such that the hinge pin receivers extend to both sides of the second frame member in a use orientation, wherein articles are attached to hinge pin receivers, and wherein the weight of said articles rests on the first top side within the footprint of the first frame member, and wherein said weight of said articles provides stability of said article support device wherein additional articles can rest on hinge pin receivers wherein the mass and weight of said additional articles can extend beyond the footprint of the first frame member of said device.

4. The article support device as in claim 1, wherein a plurality of second frame members are vertically attached to a horizontally positioned first frame member and a plurality of hinge pin receivers are positioned in a use orientation wherein said hinge pin receivers support articles and/or platforms are above the first top side of said device.

5. The article support device in claim 1, wherein a plurality removable axle frames are attached to tubular cross bar members of the horizontally positioned first frame member wherein the legs of said axle frames are vertically orientated and wherein said axle frames are positioned below said first frame member of said device in a use orientation wherein said device is elevated at a height equal to the length of said legs and wherein articles being supported by said device are above the first top side of said device.

6. The article support device in claim 1, wherein the channel member of a first removable axle frame is attached to a tubular cross bar member at the first end of the horizontally positioned first frame member and wherein the axle tube of said axle frame accommodates an axle shaft and wherein said shaft accommodates tires for convenient transportation of said device, and wherein the channel member of a second removable axle frame is attached to a tubular cross bar member at the second end of the horizontally positioned first frame member in a use orientation wherein the first end of said first frame member is elevated at a height equal to the radius of a said tires and wherein the second end of said first frame member is elevated at a height equal to the length of said legs of said second axle frame and wherein articles supported by said device are above the first top side of said device.

7. The article support device in claim 1, wherein a plurality removable axle frames are attached to tubular cross bar members of the horizontally positioned first frame member, wherein the legs of said axle frames are vertically orientated and wherein said axle frames are positioned below the article support device and wherein the axle tubes of said axle frames accommodate axle shafts and said shafts accommodate tires for convenient transportation of said device, and wherein said device is elevated at a height equal to the radius of said tires in a use orientation wherein articles being supported by said device are above the first top side of said device.

8. The article support device in claim 1, wherein a plurality removable axle frames are attached to tubular cross bar members of the horizontally positioned first frame member wherein the legs of said axle frames are horizontally orientated and wherein said axle frames are positioned below the article support device in a use orientation wherein articles being supported by said device are above the first top side of said device, and wherein the axle tube of said axle frames accommodate axle shafts and said shafts accommodate tires for convenient transportation of said device with the load distributed among tires and wherein the orientation of said axle frame provides unobstructed clearance between said axle tube and terrain below said device.

9. The article support device in claim 1, wherein the channel member of a first removable axle frame is attached to a tubular cross bar member at the first end of the horizontally positioned first frame member wherein the legs of said axle frame are vertically orientated and wherein said axle frame is positioned above said first frame member of said device, and wherein the axle tube of said axle frame accommodates an axle shaft and wherein said shaft accommodates tires, and wherein the first end of said first frame member is elevated at a height equal to the radius of a said tires, and wherein the channel member of a second removable axle frame is attached to a tubular cross bar member at the second end of the horizontally positioned first frame member wherein the legs of second axle frames are vertically orientated and wherein said second axle frame is positioned above said first frame member of said device in a use orientation wherein articles rest on the leg support members of said axle frames and wherein articles are articles supported by said device are above the first top side.

10. The article support device in claim 1, wherein the a said axle frame is attached to a tubular cross bar member of the horizontally positioned first frame member, wherein said channel member of said axle frame is attached to said first frame member in a use orientation wherein articles supported by said device are above the first top side of said first frame member and wherein the axle tubes of said axle frames accommodate axle shafts and said shafts accommodate tires for convenient transportation of said device.

11. The article support device as in claim 1, wherein a said axle frame is attached a tubular cross bar member of the horizontally positioned first frame member, wherein said channel member of said axle frame is attached to said first frame member in a use orientation wherein articles supported by said device are above the first bottom side of said first frame member and wherein the axle tubes of said axle frames accommodate axle shafts and said shafts accommodate tires for convenient transportation of said device.

* * * * *